(12) United States Patent
Shimada et al.

(10) Patent No.: US 9,713,857 B2
(45) Date of Patent: Jul. 25, 2017

(54) LASER JOINING STRUCTURE AND LASER JOINING METHOD

(71) Applicant: TOYOTA JIDOSHA KABUSHIKI KAISHA, Toyota-shi, Aichi-ken (JP)

(72) Inventors: Yoshimune Shimada, Miyoshi (JP); Akiyoshi Watanabe, Toyota (JP); Hideyuki Yoshioka, Okazaki (JP); Yoshio Nakamura, Miyoshi (JP); Norimasa Koreishi, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 177 days.

(21) Appl. No.: 14/421,237

(22) PCT Filed: Nov. 27, 2012

(86) PCT No.: PCT/JP2012/080640
§ 371 (c)(1),
(2) Date: Feb. 12, 2015

(87) PCT Pub. No.: WO2014/083617
PCT Pub. Date: Jun. 5, 2014

(65) Prior Publication Data
US 2015/0209909 A1 Jul. 30, 2015

(51) Int. Cl.
*B23K 26/32* (2014.01)
*B23K 26/22* (2006.01)
(Continued)

(52) U.S. Cl.
CPC .............. *B23K 26/32* (2013.01); *B23K 26/22* (2013.01); *B23K 33/008* (2013.01);
(Continued)

(58) Field of Classification Search
CPC .... B23K 26/22; B23K 26/32; B23K 26/3206; B23K 33/008; B23K 2201/006;
(Continued)

(56) References Cited

U.S. PATENT DOCUMENTS 4,654,505 A * 3/1987 Sciaky ................. B23K 26/067
219/121.63
4,694,139 A * 9/1987 Roder ................ B23K 26/0884
219/121.67
(Continued)

FOREIGN PATENT DOCUMENTS

EP 0453698 A1 10/1991
JP H09-30414 A 2/1997
(Continued)

*Primary Examiner* — James Ference
(74) *Attorney, Agent, or Firm* — Andrews Kurth Kenyon LLP

(57) ABSTRACT

To obtain a laser joining structure and a laser joining method that can suppress a decrease in strength or rigidity of a third plate that is disposed at an interval apart from at least two metal plates. A laser joining structure has at least two metal plates whose superposed region, at which the at least two metal plates are superposed with one another, is joined by laser welded portions at two or more places, and a third plate that is disposed at an interval apart from the superposed region. A through-portion, that passes-through the third plate and through which laser light is irradiated onto the superposed region and that is of a number that is less than a number of the laser welded portions, is formed in the third plate.

5 Claims, 9 Drawing Sheets

(51) Int. Cl.
*B23K 33/00* (2006.01)
*B23K 101/00* (2006.01)
*B23K 101/18* (2006.01)
*B23K 101/28* (2006.01)
*B23K 103/04* (2006.01)
*B23K 103/10* (2006.01)
*B23K 103/08* (2006.01)
*B23K 103/00* (2006.01)
*B23K 103/02* (2006.01)

(52) U.S. Cl.
CPC .... *B23K 2201/006* (2013.01); *B23K 2201/18* (2013.01); *B23K 2201/28* (2013.01); *B23K 2203/02* (2013.01); *B23K 2203/04* (2013.01); *B23K 2203/08* (2013.01); *B23K 2203/10* (2013.01); *B23K 2203/50* (2015.10); *Y10T 403/478* (2015.01)

(58) Field of Classification Search
CPC ............ B23K 2201/18; B23K 2201/28; B23K 2203/04; B23K 2203/08; B23K 2203/10; B23K 2203/50; B23K 2203/02; Y10T 403/478
See application file for complete search history.

(56) References Cited

U.S. PATENT DOCUMENTS

| | | | | |
|---|---|---|---|---|
| 5,053,601 A | * | 10/1991 | Landtwing | B21D 28/22 219/121.45 |
| 5,907,135 A | * | 5/1999 | Hayakawa | F01N 1/02 181/272 |
| 6,592,239 B1 | * | 7/2003 | Akiyama | B29C 65/1638 156/272.8 |
| 2002/0104834 A1 | * | 8/2002 | Mangiarino | B23K 26/02 219/121.78 |
| 2003/0024905 A1 | * | 2/2003 | Tanaka | B23K 26/067 219/121.6 |
| 2005/0082265 A1 | * | 4/2005 | Yamabuki | B29C 65/1635 219/121.64 |
| 2005/0109971 A1 | * | 5/2005 | Sano | B29C 65/1635 251/305 |
| 2005/0169346 A1 | * | 8/2005 | Murray | B23K 26/032 374/121 |
| 2006/0087153 A1 | * | 4/2006 | Lendway | B62D 25/2054 296/187.01 |
| 2007/0193991 A1 | * | 8/2007 | Yamasaki | B23K 1/0056 219/121.85 |
| 2008/0116175 A1 | * | 5/2008 | Ballerini | B23K 26/24 219/74 |
| 2009/0179013 A1 | * | 7/2009 | Toeniskoetter | B23K 26/0884 219/121.64 |
| 2009/0302011 A1 | * | 12/2009 | Behr | B23K 26/04 219/121.64 |
| 2010/0062223 A1 | * | 3/2010 | Geisler | B23K 33/00 428/172 |
| 2010/0181816 A1 | * | 7/2010 | Kienke | B23K 33/00 297/362 |
| 2010/0206857 A1 | * | 8/2010 | Bea | B23K 26/0734 219/121.64 |
| 2010/0259070 A1 | * | 10/2010 | Klein | B23K 26/26 296/193.06 |
| 2011/0094673 A1 | * | 4/2011 | Daly | B29C 65/1635 156/272.8 |
| 2012/0241424 A1 | * | 9/2012 | Sagesaka | B29C 65/1635 219/121.63 |
| 2015/0102623 A1 | * | 4/2015 | Watanabe | B62D 25/04 296/30 |
| 2015/0104244 A1 | * | 4/2015 | Watanabe | B23K 26/244 403/271 |
| 2015/0175218 A1 | * | 6/2015 | Yoshioka | B62D 25/04 296/203.01 |
| 2015/0209909 A1 | * | 7/2015 | Shimada | B23K 26/3206 403/271 |

FOREIGN PATENT DOCUMENTS

| | | |
|---|---|---|
| JP | 2009-154194 A | 7/2009 |
| JP | 2011-162086 A | 8/2011 |
| JP | 2012-115876 A | 6/2012 |

* cited by examiner

LASER JOINING STRUCTURE AND LASER JOINING METHOD

CROSS-REFERENCE TO RELATED APPLICATION

This is a national phase application based on the PCT International Patent Application No. PCT/JP2012/080640 filed Nov. 27, 2012, the entire contents of which are incorporated herein by reference.

TECHNICAL FIELD

The present invention relates to a laser joining structure and a laser joining method.

BACKGROUND ART

In Patent Document 1 (Japanese Patent Application Laid-Open (JP-A) No. H09-030414), when a plate-shaped vertical skeleton member or the like exists at the near side of a spot welded region at which two or more outer plates and a reinforcing plate are joined, through-holes are provided in the plate-shaped vertical skeleton member, and spot welding is carried out by passing an electrode within these through-holes (see FIG. 3).

Further, in Patent Document 2 ((JP-A) No. 2011-162086), when an outer plate and a first reinforcing plate are joined by laser welding, laser light is irradiated from the outer side of a second reinforcing plate that is disposed at the near side of the outer plate and the first reinforcing plate, and the outer plate and the first reinforcing plate that exist at the inner side of the second reinforcing plate, are laser welded. In this laser welding process, in the second reinforcing plate, a key hole is filled up and laser marks are formed.
[Patent Document 1] JP-A No. H09-030414
[Patent Document 2] JP-A No. 2011-162086
[Patent Document 3] JP-A No. 2012-115876
[Patent Document 4] JP-A No. 2009-154194

DISCLOSURE OF INVENTION

Technical Problem

However, in a case in accordance with aforementioned Patent Document 1, a number of through-holes, that is equal to the number of spot welded places of the outer plates and the reinforcing plate, exist in the plate-shaped vertical skeleton member or the like. Therefore, the more that the number of through holes of the plate-shaped vertical skeleton member or the like increases, the greater the possibility that the strength or rigidity of the plates will decrease.

Further, in a case in accordance with aforementioned Patent Document 2, a number of laser marks, that is equal to the number of laser welded places between the outer plate and the first reinforcing plate, remain in the second reinforcing plate. Therefore, the more that the number of laser marks in the second reinforcing plate increases, the greater the possibility that the strength or rigidity of the reinforcing plates will decrease.

In view of the above-described circumstances, an object of the present invention is to provide a laser joining structure and laser joining method that can suppress a decrease in strength or rigidity of a third plate that is disposed at an interval apart from at least two metal plates.

Solution to Problem

A laser joining structure of a first aspect of the present invention comprises: at least two metal plates that are disposed so as to be superposed with one another, and at which the superposed region is joined by laser welded portions at two or more places; a third plate, other than the at least two metal plates, that is disposed at an interval apart from the superposed region; and a through-portion that: (1) is formed in the third plate; (2) at which laser light passes-through the third plate and is irradiated onto the superposed region; and (3) is of a number that is less than a number of the laser welded portions.

In a laser joining structure of a second aspect of the present invention, in the laser joining structure of the first aspect, a hole diameter of the through-portion is set to a dimension that is such that an electrode for spot welding cannot be inserted therethrough but the laser light can pass therethrough.

In a laser joining structure of a third aspect of the present invention, in the laser joining structure of the first aspect or the second aspect, the third plate is a metal plate, and a closed cross-section is formed by at least the two metal plates and the third metal plate.

In a laser joining structure of a fourth aspect of the present invention, in the laser joining structure of the third aspect, a vehicle skeleton member is structured by at least the two metal plates and the third metal plate.

A laser joining method of a fifth aspect of the present invention comprises: a step of placing at least two metal plates so as to be superposed with one another, and irradiating laser light from a laser light irradiating device through a through-portion, which is formed in a third plate that is disposed at an interval apart from the superposed region, onto the superposed region, and forming a laser welded portion at the superposed region; and a step of, by changing a laser light irradiation angle of the laser light irradiating device and irradiating laser light through the same through-portion onto the superposed region, forming one or two or more laser welded portions, which are different than the laser welded portion, at the superposed region.

In accordance with the laser joining structure of the first aspect of the present invention, at least two metal plates are disposed so as to be superposed with one another, and the third plate is disposed at an interval apart from the superposed region. The through-portion is formed in the third plate, and, due to laser light passing through the through-portion and being irradiated onto the superposed region, the superposed region of the at least two metal plates is joined by a laser welded portion. At this time, the number of the through-portions of the third plate is set to a number that is less than the number of the laser welded portions. By changing the irradiation angle of the laser light that passes-through the through-portion, plural (at two or more places) laser welded portions are formed at the superposed region by the one through-portion. Due thereto, the number of through-portions of the third plate can be made to be less than the number of laser welded portions, or, the need to provide plural through-portions in the third plate is eliminated. Therefore, a decrease in the strength or rigidity of the third plate can be suppressed.

In accordance with the laser joining structure of the second aspect of the present invention, the hole diameter of the through-portion is set to a dimension that is such that an electrode for spot welding cannot be inserted therethrough and laser light can pass therethrough, and the through-portion can be set to be the minimum dimension through which laser light can pass. Therefore, as compared with a case in which a hole for passage of an electrode for spot welding is formed in the third plate, the dimension of the through-portion can be reduced, and a decrease in the strength or the rigidity of the third plate can be suppressed even more.

In accordance with the laser joining structure of the third aspect of the present invention, the third plate is a metal plate, and, in a case in which a closed cross-section is formed at least by the two metal plates and the third metal plate, a decrease in the strength or rigidity of the third metal plate can be suppressed.

In accordance with the laser joining structure of the fourth aspect of the present invention, in a case in which a vehicle skeleton member is formed by at least the two metal plates and the third metal plate, a decrease in the strength or rigidity of the third metal plate can be suppressed.

In accordance with the laser joining method of the fifth aspect of the present invention, laser light is irradiated from a laser light irradiating device onto a superposed region through the through-portion of the third plate that is disposed at an interval apart from the superposed region of the at least two metal plates, and a laser welded portion is formed at the superposed region. Moreover, by changing the laser light irradiation angle of the laser light irradiating device and irradiating laser light onto the superposed region through the same through-portion, one or two or more laser welded portions, that are different than the aforementioned laser welded portion, are formed at the superposed region. Due thereto, the superposed region of the at least two metal plates is joined by plural laser welded portions. Therefore, the number of through-portions of the third plate can be made to be less than the number of laser welded portions, or, the need to provide plural through-portions in the third plate is eliminated. Due thereto, a decrease in the strength or rigidity of the third plate can be suppressed.

Advantageous Effects of Invention

In accordance with the laser jointing structure and laser joining method relating to the present invention, a decrease in strength or rigidity of a third plate that is disposed at an interval apart from at least two metal plates can be suppressed.

BEST MODES FOR CARRYING OUT THE INVENTION

A first embodiment of a laser joining structure relating to the present invention is described hereinafter by using FIG. 1 through FIG. 3.

Figure 1:
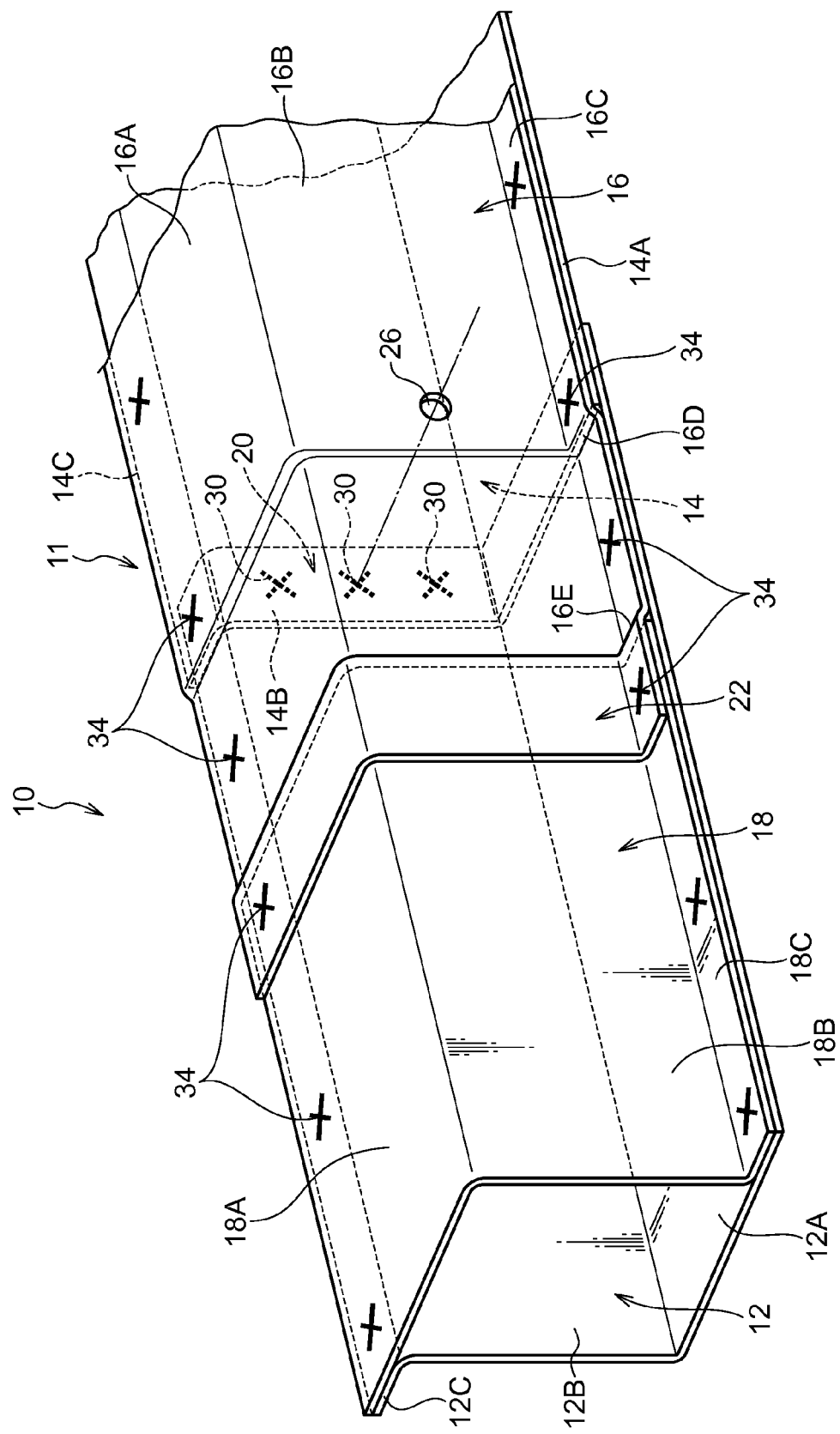
FIG. 1 is a perspective view showing a structural member to which a laser joining structure relating to a first embodiment is applied.

A structural member 10, to which a laser joining structure 11 relating to the present embodiment is applied, is shown in a perspective view in FIG. 1. The vicinity of a superposed region 20 of the structural member 10, to which the laser joining structure 11 relating to the present embodiment is applied, is shown in a cross-sectional view in FIG. 2. Note that, in order to make the explanation easy to understand, in FIG. 1 and FIG. 2, there are cases in which, for convenience, vertical, lateral, upward and downward are expressed in accordance with the top-bottom direction and the left-right direction in the drawings. However, it is not intended that the actual structural member 10 is disposed within a space in accordance with the top-bottom directions and the left-right directions in FIG. 1 and FIG. 2, and the direction in which the structural member 10 is placed can be set appropriately.

Figure 2:
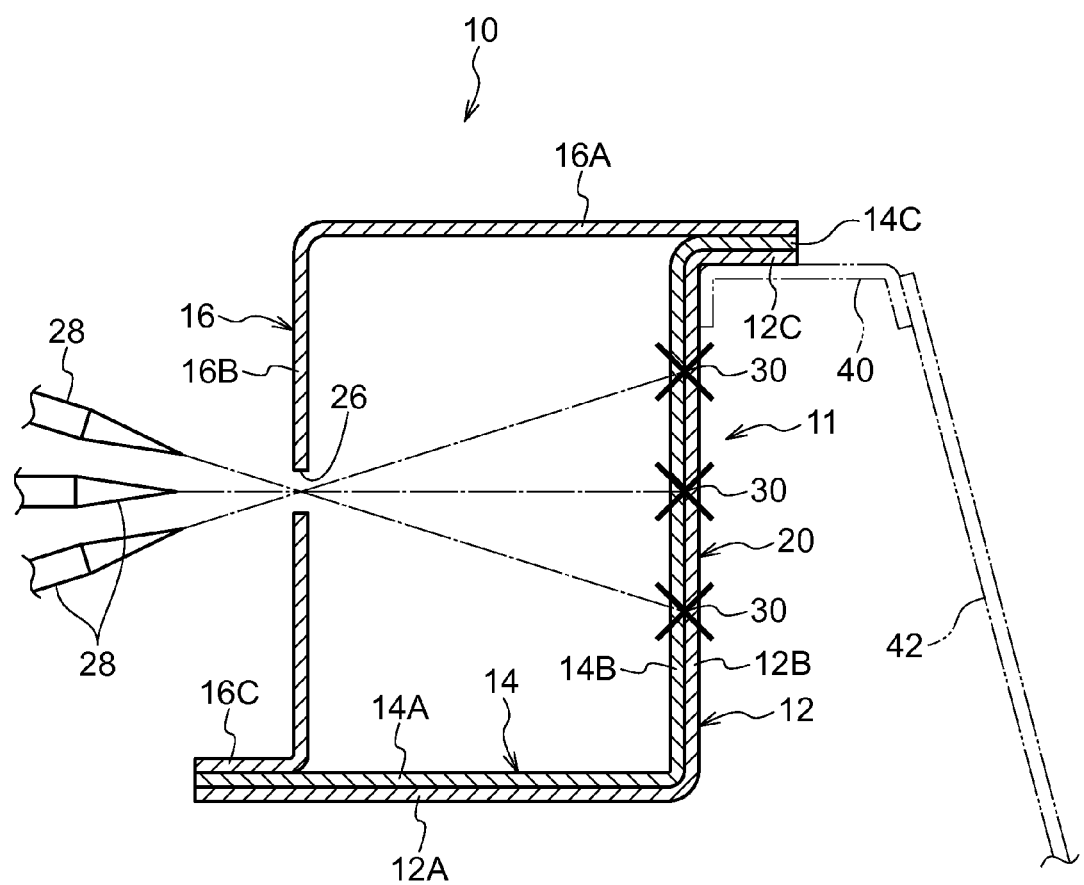
FIG. 2 is a cross-sectional view showing the vicinity of a superposed region of the structural member to which the laser joining structure relating to the first embodiment is applied.

As shown in FIG. 1 and FIG. 2, the cross-section, that is orthogonal to the longitudinal direction, of the structural member 10 to which the laser joining structure 11 is applied is made to be a closed cross-section that is substantially rectangular. The structural member 10 has a first metal plate 12 that is disposed at the far side in FIG. 1, and a second metal plate 14 that is disposed at the far side in FIG. 1 and is joined to the end portion at the longitudinal direction right side of the first metal plate 12. Moreover, the structural member 10 has a third metal plate 16 that serves as a third plate and is disposed at the near side in FIG. 1, and a fourth metal plate 18 that is disposed at the near side in FIG. 1 and is joined to the end portion at the longitudinal direction left side of the third metal plate 16.

The cross-section, that is orthogonal to the longitudinal direction, of the first metal plate 12 is formed in a substantial crank shape. More concretely, the first metal plate 12 has a lateral wall portion (bottom wall portion) 12A that is disposed along the lateral direction in FIG. 1, a vertical wall portion 12B that extends in a substantially orthogonal direction from an end portion of the lateral wall portion 12A, and a bent portion 12C that is bent from the upper end portion of the vertical wall portion 12B in the direction opposite the lateral wall portion 12A. The cross-section, that is orthogonal to the longitudinal direction, of the second metal plate 14 is formed in a substantial crank shape. More concretely, in the same way as the first metal plate 12, the second metal plate 14 has a lateral wall portion 14A and a vertical wall portion 14B and a bent portion 14C. The structural member 10 has the superposed region 20 at which the end portion at the longitudinal direction left side of the second metal plate 14 is superposed on the upper side of the end portion at the longitudinal direction right side of the first metal plate 12 (see FIG. 1).

The cross-section, that is orthogonal to the longitudinal direction, of the third metal plate 16 is formed in a substantial crank shape. More concretely, the third metal plate 16 has a lateral wall portion (top wall portion) 16A that is disposed at an interval apart from the lateral wall portions 12A, 14A, a vertical wall portion 16B that extends in a substantially orthogonal direction from an end portion of the lateral wall portion 16A and is disposed at an interval apart from the vertical wall portions 12B, 14B, and a bent portion 16C that is bent from the lower end portion of the vertical wall portion 16B in the direction opposite the lateral wall portion 16A. The cross-section, that is orthogonal to the longitudinal direction, of the fourth metal plate 18 is formed in a substantial crank shape. More concretely, in the same way as the third metal plate 16, the fourth metal plate 18 has a lateral wall portion 18A and a vertical wall portion 18B and a bent portion 18C. The structural member 10 has a superposed region 22 at which the end portion at the longitudinal direction right side of the fourth metal plate 18 is superposed with the lower side of the end portion at the longitudinal direction left side of the third metal plate 16. The superposed region 20 and the superposed region 22 are disposed such that the positions thereof in the longitudinal direction of the structural member 10 are offset.

The bent portion 12C of the first metal plate 12 and the bent portion 14C of the second metal plate 14, and the final end portion of the lateral wall portion 18A of the fourth metal plate 18 and the final end portion of the lateral wall portion 16A of the third metal plate 16, are disposed in a planarly-contacting state and are joined together by spot welding 34. The bent portion 16C of the third metal plate 16 and the bent portion 18C of the fourth metal plate 18, and the final end portion of the lateral wall portion 14A of the second metal plate 14 and the final end portion of the lateral wall portion 12A of the first metal plate 12, are disposed in a planarly-contacting state and are joined together by the spot welding 34.

At this time, at the superposed region 20 of the first metal plate 12 and the second metal plate 14, the bent portion 12C of the first metal plate 12 and the bent portion 14C of the second metal plate 14 and the final end portion of the lateral wall portion 16A of the third metal plate 16 are joined, in a superposed state, by the spot welding 34 (see FIG. 2). Further, at the superposed region 20 of the first metal plate 12 and the second metal plate 14, the final end portion of the lateral wall portion 12A of the first metal plate 12 and the final end portion of the lateral wall portion 14A of the second metal plate 14 and the bent portion 16C of the third metal plate 16 are joined, in a superposed state, by the spot welding 34 (see FIG. 2). As shown in FIG. 1, a step portion 16D, that is bent in accordance with the step of the first metal plate 12 and the end portion at the longitudinal direction left side of the second metal plate 14, is formed at the third metal plate 16.

Further, as shown in FIG. 1, at the superposed region 22 of the third metal plate 16 and the fourth metal plate 18, the bent portion 12C of the first metal plate 12 and the final end portion of the lateral wall portion 18A of the fourth metal plate 18 and the final end portion of the lateral wall portion 16A of the third metal plate 16 are joined, in a superposed state, by the spot welding 34. Moreover, at the superposed region 22 of the third metal plate 16 and the fourth metal plate 18, the final end portion of the lateral wall portion 12A of the first metal plate 12 and the bent portion 18C of the fourth metal plate 18 and the bent portion 16C of the third metal plate 16 are joined, in a superposed state, by the spot welding 34. A step portion 16E, that is bent in accordance with the step of the first metal plate 12 and the end portion at the longitudinal direction right side of the fourth metal plate 18, is formed at the third metal plate 16.

As shown in FIG. 2, at the structural member 10, the vertical wall portion 16B of the third metal plate 16 is disposed at a predetermined interval from the superposed region 20 of the first metal plate 12 and the second metal plate 14. A through-hole 26, that serves as a through-portion and that passes-through the vertical wall portion 16B, is formed in the vertical wall portion 16B at a position facing the superposed region 20 of the first metal plate 12 and the second metal plate 14 (see FIG. 1). In the present embodiment, the through-hole 26 is circular, but is not limited to this, and may be another shape such as oval, rectangular, rhomboid, polygonal, or the like.

One end portion of a plate material 40, that is substantially upside-down U-shaped, is joined by welding or the like to the bent portion 12C and the upper end portion of the vertical wall portion 12B of the first metal plate 12. The upper end portion of a plate material 42, that extends in a direction facing the vertical wall portion 12B of the first metal plate 12, is joined by welding or the like to the other end portion of the plate material 40. Due thereto, even if an attempt is made to join the superposed region 20 of the first metal plate 12 and the second metal plate 14 by welding from the plate material 42 side (the right side in FIG. 2), the tool for welding (an electrode for spot welding, a laser light irradiating device, or the like) interferes with the plate material 42, and the tool for welding cannot be placed at an appropriate position. In other words, the tool for welding cannot be placed at a position that contacts or faces the superposed region 20 of the first metal plate 12 and the second metal plate 14, and the superposed region 20 cannot be welded from the plate material 42 side.

Figure 3:
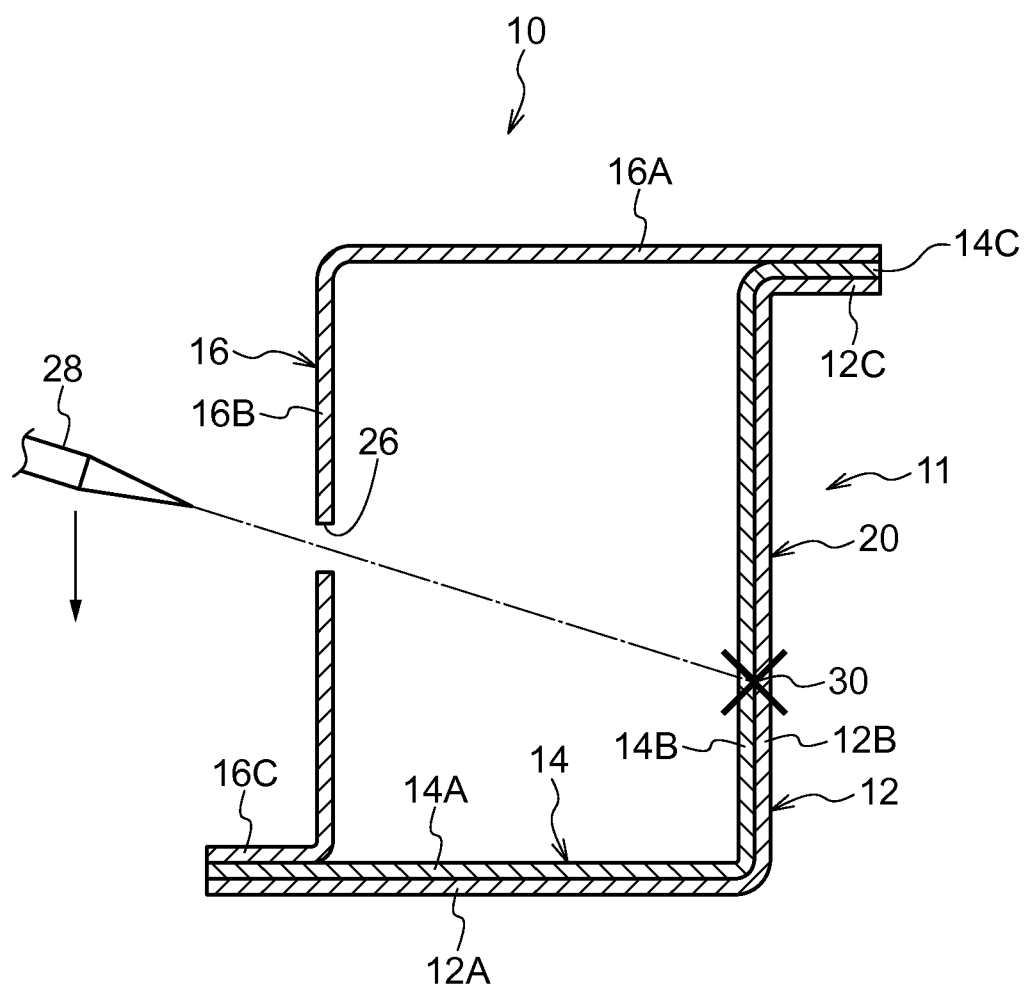
FIG. 3 is a cross-sectional view showing a laser joining method for forming the structural member shown in FIG. 2.

At the structural member 10 of the present embodiment, as shown in FIG. 2 and FIG. 3, the through-hole 26 is formed in the vertical wall portion 16B, and a laser welded portion 30 is formed at the superposed region 20 by laser light being irradiated from a laser light irradiating section 28, that serves as laser light irradiating device, through the through-hole 26 and onto the superposed region 20 of the first metal plate 12 and the second metal plate 14. Then, by changing the laser light irradiation angle of the laser light irradiating section 28 and irradiating laser light onto the superposed region 20 through the same through-hole 26, one or two or more (two in the present embodiment) of the laser welded portions 30, that are different than the aforementioned laser welded portion 30, are formed at the superposed region 20. Due thereto, the superposed region 20 is joined by a plurality (three in the present embodiment) of the laser welded portions 30.

Therefore the number (one in the present embodiment) of the through-hole 26 of the third metal plate 16 is a number that is smaller than the number (three in the present embodiment) of the laser welded portions 30.

The inner diameter (hole diameter) of the through-hole 26 is set to a dimension that is such that an electrode for spot welding cannot be inserted therethrough and the laser light of the laser light irradiating section 28 can pass therethrough. Due thereto, the inner diameter of the through-hole 26 can be set to the minimum dimension through which laser light can pass. In the present embodiment, the inner diameter of the through-hole 26 is set to, for example, φ approximately 10 to 15 mm. In order to insert a usual electrode for spot welding through a through-hole, the inner diameter of the through-hole must be greater than or equal to φ approximately 30 mm for example. Therefore, the inner diameter of the through-hole 26 can be made to be very small as compared with a case in which an electrode for spot welding is to be inserted through a through-hole. Due thereto, a decrease in the strength or rigidity of the third metal plate 16 is suppressed.

At the structural member 10, mating surfaces (joined regions) other than the superposed region 20 of the first metal plate 12 and the second metal plate 14 can be accessed by a tool for welding (an electrode for spot welding, a laser light irradiating section, or the like), and can be joined by a general welding method. At the structural member 10, a closed cross-section is formed by joining the mating surfaces of the first metal plate 12 and the second metal plate 14 and the third metal plate 16 and the fourth metal plate 18.

In the present embodiment, the first metal plate 12, the second metal plate 14, the third metal plate 16 and the fourth metal plate 18 are formed of, for example, a steel plate (an alloy whose main component is iron), an aluminum alloy, or the like.

The structural member 10 of the present embodiment is used in, for example, automobiles, railroad cars, construction members, and the like.

Before describing the operation and effects of the structural member 10 of the present embodiment, structural members of a first comparative example and a second comparative example are described. Note that structural portions that are the same as those of the first embodiment are denoted by the same reference numerals, and description thereof is omitted.

Figure 7:
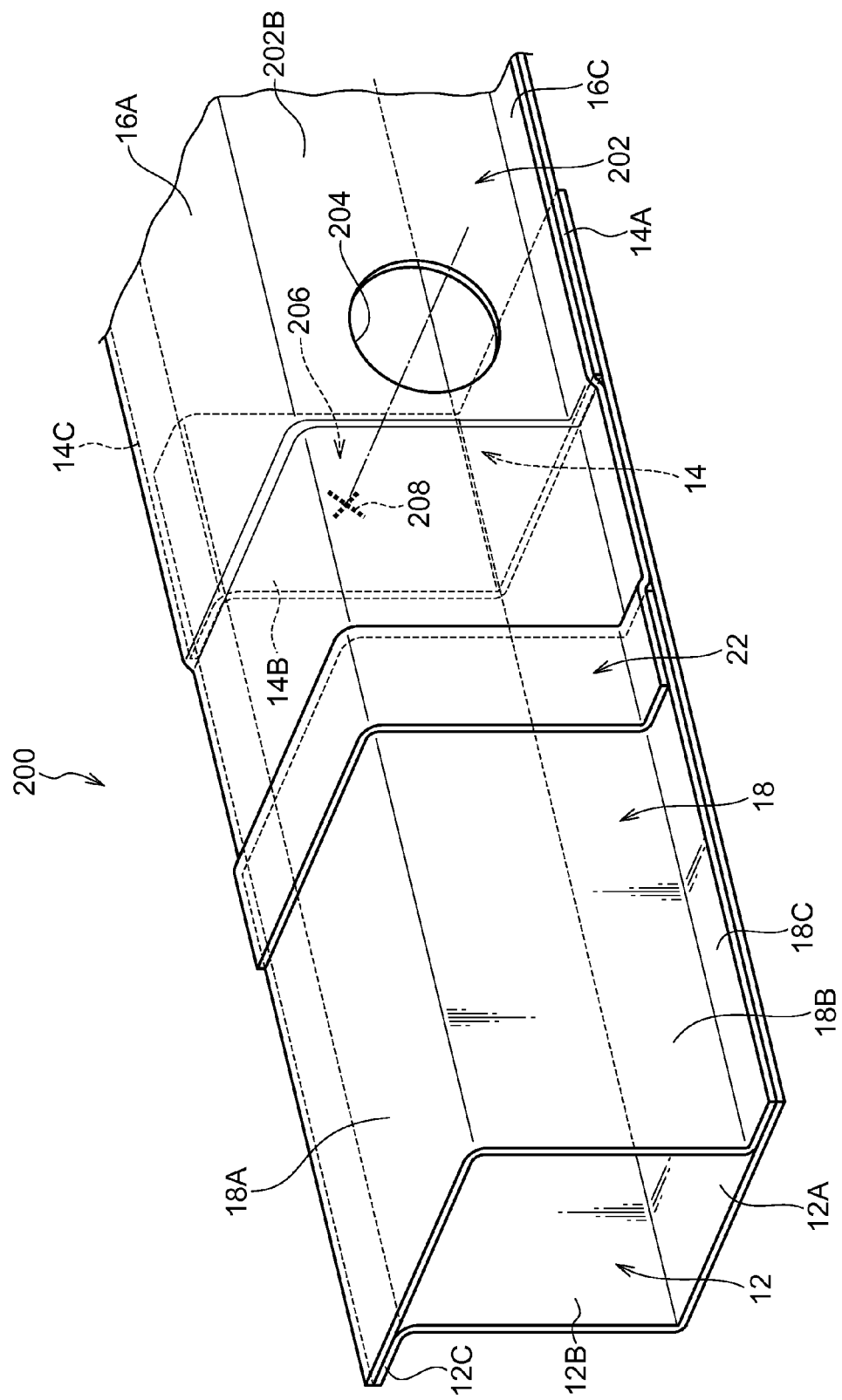
FIG. 7 is a perspective view showing a structural member to which a joining structure by spot welding relating to a first comparative example is applied.
Figure 8:
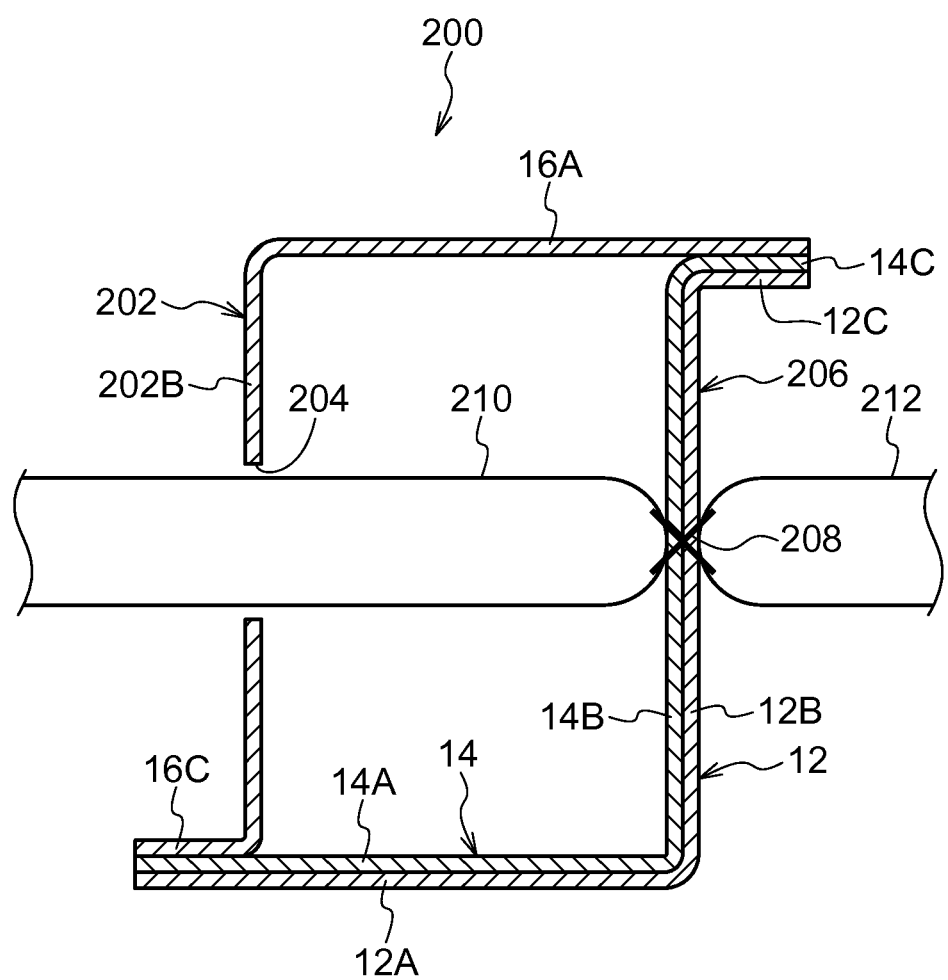
FIG. 8 is a cross-sectional view showing a vicinity of a superposed region of the structural member shown in FIG. 7.

An example in which a superposed region 206 of the first metal plate 12 and the second metal plate 14 is joined by spot welding is shown in FIG. 7 and FIG. 8 as a structural member 200 of a first comparative example. As shown in FIG. 7 and FIG. 8, at the structural member 200, a closed cross-section is formed by the first metal plate 12 and the second metal plate 14, and a third metal plate 202. A vertical wall portion 202B of the third metal plate 202 is disposed at an interval apart from the superposed region 206 of the first metal plate 12 and the second metal plate 14. A through-hole 204 for the passage of an electrode 210 for spot welding is formed in the vertical wall portion 202B. An inner diameter φ of the through-hole 204 is formed to be larger than the outer diameter of the electrode 210, and, in the present comparative example, is set to be φ approximately 30 mm for example.

As shown in FIG. 8, the electrode 210 is inserted-in from the through-hole 204 of the vertical wall portion 202B, and the distal end of the electrode 210 is made to contact the superposed region 206 (the second metal plate 14 side), and the distal end of an electrode 212 for spot welding is made to contact the superposed region 206 (the first metal plate 12 side) from the side opposite the electrode 210. Then, by supplying electricity while applying pressure to the superposed region 206 by the electrodes 210, 212, the contacted portions are set in fused states locally, and a spot welded portion 208 is formed. Namely, the superposed region 206 of the first metal plate 12 and the second metal plate 14 is joined by the spot welded portion 208.

At this structural member 200, the inner diameter of the through-hole 204 of the third metal plate 202 is set to be φ approximately 30 mm in order for the electrode 210 to be passed therethrough, and the inner diameter of the through-hole 204 is larger than the inner diameter of the through-hole 26 that is formed in the third metal plate 16 of the present embodiment. Further, a number of the through-holes 204, that is the same as the number of the spot welded portions 208, must be formed in the third metal plate 202. Therefore, by providing the through-holes 204 in the third metal plate 202, there is the possibility that the strength or rigidity of the third metal plate 202 will decrease.

Figure 9:
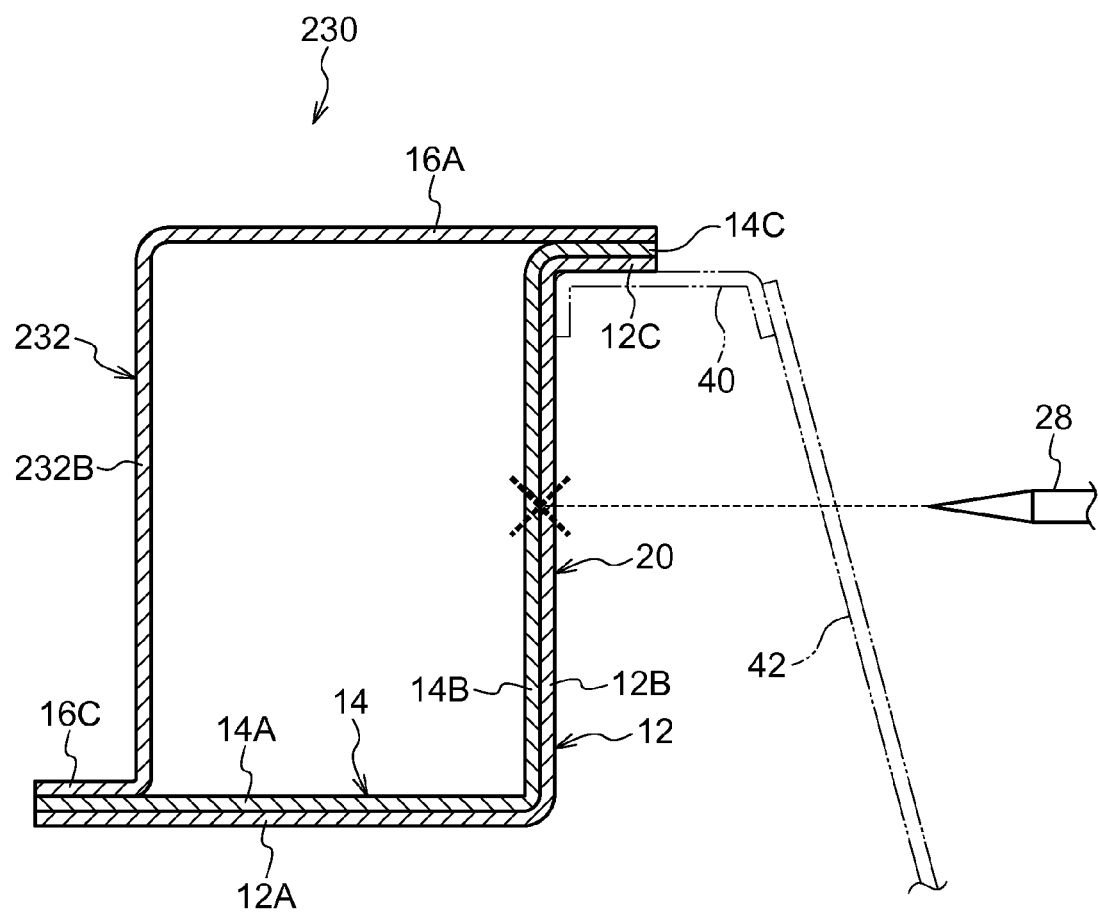
FIG. 9 is a cross-sectional view showing a problem to be caused at the time of laser joining of a structural member relating to a second comparative example.

FIG. 9 describes, as a structural member 230 of a second comparative example, an example in which laser welding is difficult at the time of joining together parts that structure a closed cross-section by laser welding. As shown in FIG. 9, at the structural member 230 of the second comparative example, a closed cross-section is formed by the first metal plate 12 and the second metal plate 14, and a third metal plate 232. A vertical wall portion 232B of the third metal plate 232 is disposed at an interval apart from the superposed region 20 of the first metal plate 12 and the second metal plate 14, and a through-hole is not formed in the vertical wall portion 232B. Further, the plate material 42 is disposed, at the interval from the superposed region 20 of the first metal plate 12 and the second metal plate 14, at the side opposite the vertical wall portion 232B of the third metal plate 232.

In this structural member 230, even if an attempt is made to insert the laser light irradiating section 28 in from the plate material 42 side at the time of welding the superposed region 20 of the first metal plate 12 and the second metal plate 14, the plate material 42 gets in the way, and the laser light irradiating section 28 cannot be placed at a position facing the superposed region 20. Therefore, it is difficult to irradiate laser light from the laser light irradiating section 28 and weld the superposed region 20.

A laser joining method and the operation and effects of the structural member 10 of the present embodiment are described next.

At the structural member 10 of the present embodiment, as shown in FIG. 3, the through-hole 26 is formed in the vertical wall portion 16B of the third metal plate 16. Therefore, at the time of welding the superposed region 20 of the first metal plate 12 and the second metal plate 14, the laser welded portion 30 is formed at the superposed region 20 by irradiating laser light from the laser light irradiating section 28 through this through-hole 26 and onto the superposed region 20. Then, as shown in FIG. 2, by changing the laser light irradiation angle of the laser light irradiating section 28 plural times and irradiating laser light each time through the same through-hole 26 onto the superposed region 20, the plural laser welded portions 30, that are different than the aforementioned laser welded portion 30, are formed at the superposed region 20. Due thereto, the superposed region 20 of the first metal plate 12 and the second metal plate 14 is joined by the plural (three in the present embodiment) laser welded portions 30.

In this structural member 10, by changing the laser light irradiation angle of the laser light irradiating section 28 and irradiating laser light through the through-hole 26 and onto the superposed region 20, the plural laser welded portions 30 are formed at the superposed region 20, and therefore, the number of the through-holes 26 of the third metal plate 16 is less than the number of the laser welded portions 30. In the present embodiment, by providing the one through-hole 26 in the third metal plate 16, the three laser welded portions 30 are formed at the superposed region 20. Therefore, at the structural member 10, a decrease in the strength or rigidity of the third metal plate 16 due to formation of the through-hole 26 can be suppressed.

The inner diameter (hole diameter) of the through-hole 26 is set to be a size that is such that the electrode 210 for spot welding (see FIG. 8) cannot be inserted therethrough and the laser light of the laser light irradiating section 28 can pass therethrough. Therefore, the inner diameter of the through-hole 26 can be set to be the minimum size through which laser light can pass. For example, in the first comparative example, the inner diameter of the through-hole 204 for passage of the electrode 210 for spot welding is set to be φ approximately 30 mm, but, in the present embodiment, the inner diameter of the through-hole 26 is set to be φ approximately 10 to 15 mm. Therefore, the inner diameter of the through-hole 26 can be made to be very small as compared with the case in which the electrode 210 for spot welding is inserted-through the through-hole 204. Thus, a decrease in the strength or rigidity of the third metal plate 16 due to formation of the through-hole 26 can be suppressed more reliably.

Moreover, the plural laser welded portions 30 can be formed at appropriate positions of the superposed region 20 by changing the laser light irradiation angle of the laser light irradiating section 28 and irradiating laser light through the through-hole 26 and onto the superposed region 20. Therefore, the joining force between respective members of the structural member 10 that structures a closed cross-section can be improved.

For example, in a case in which the structural member 10 is used at a vehicle skeleton member of an automobile, a decrease in the strength and a decrease in the rigidity of the joined portion can be suppressed, and the vehicle performances, such as collision safety and steering stability (body rigidity) and the like, can be improved.

Note that, instead of the structure of the first embodiment, a through-hole that serves as the through-portion may be set up in the lateral wall portion 16A of the third metal plate 16. Further, in the first embodiment, the through-hole 26, that is for passage of the laser light, is set up in the third metal plate 16 that is disposed at an interval apart from the superposed region 20 of the first metal plate 12 and the second metal plate 14, but the present invention is not limited to this. For example, the through-hole 26 that is for the passage of laser light may be set up in the plate material 42 that is disposed at an interval apart from the superposed region 20 of the first metal plate 12 and the second metal plate 14. This plate material 42 is not limited to being made of metal.

Figure 4:
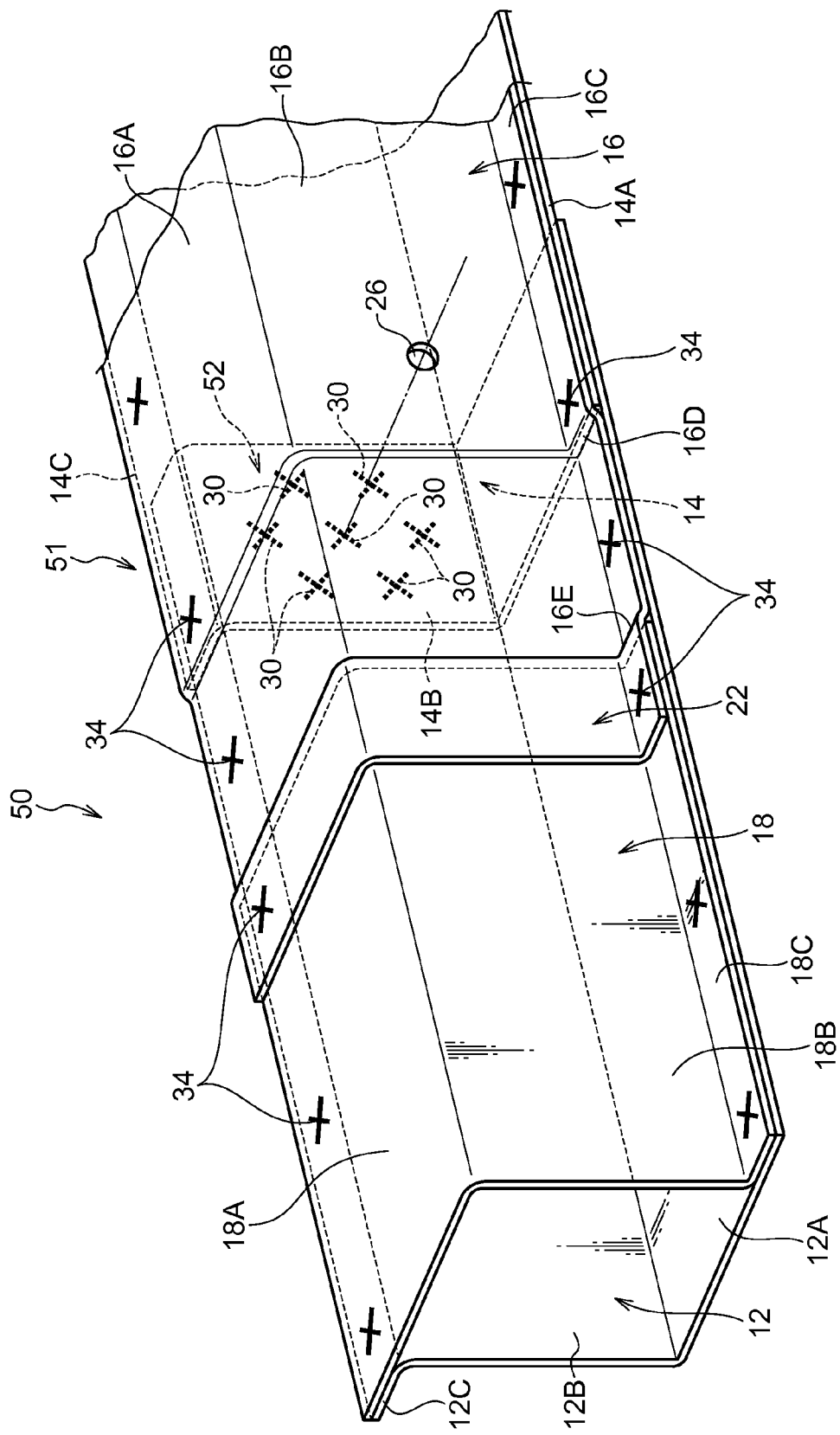
FIG. 4 is a perspective view showing a structural member to which a laser joining structure relating to a second embodiment is applied.

Next, a second embodiment of a laser joining structure relating to the present invention is described by FIG. 4. Note that structural portions that are the same as those of the above-described first embodiment are denoted by the same reference numerals, and description thereof is omitted.

As shown in FIG. 4, at a structural member 50 to which a laser joining structure 51 of the present embodiment is applied, the vertical wall portion 16B of the third metal plate 16 is disposed at an interval apart from a superposed region 52 of the first metal plate 12 and the second metal plate 14. The width in the left-right direction (the longitudinal direction of the structural member 50) of the superposed region 52 is greater than the width in the left-right direction of the superposed region 20 of the structural member 10 of the first embodiment (see FIG. 1). The through-hole 26 is formed in the vertical wall portion 16B at a position facing the superposed region 52. In this structural member 50, by changing, in the top-bottom direction and the left-right direction in FIG. 4, the irradiation angle of the laser light that is irradiated through the through-hole 26 onto the superposed region 52, a number (seven in the present embodiment) of the laser welded portions 30 that is greater than that of the structural member 10 of the first embodiment is formed at the superposed region 52.

At this structural member 50, by irradiating laser light through the one through-hole 26 of the third metal plate 16, the superposed region 52 of the first metal plate 12 and the second metal plate 14 is joined by the large number (seven in the present embodiment) of the laser welded portions 30. Therefore, the joining force of the first metal plate 12 and the second metal plate 14 can be improved more.

Figure 5:
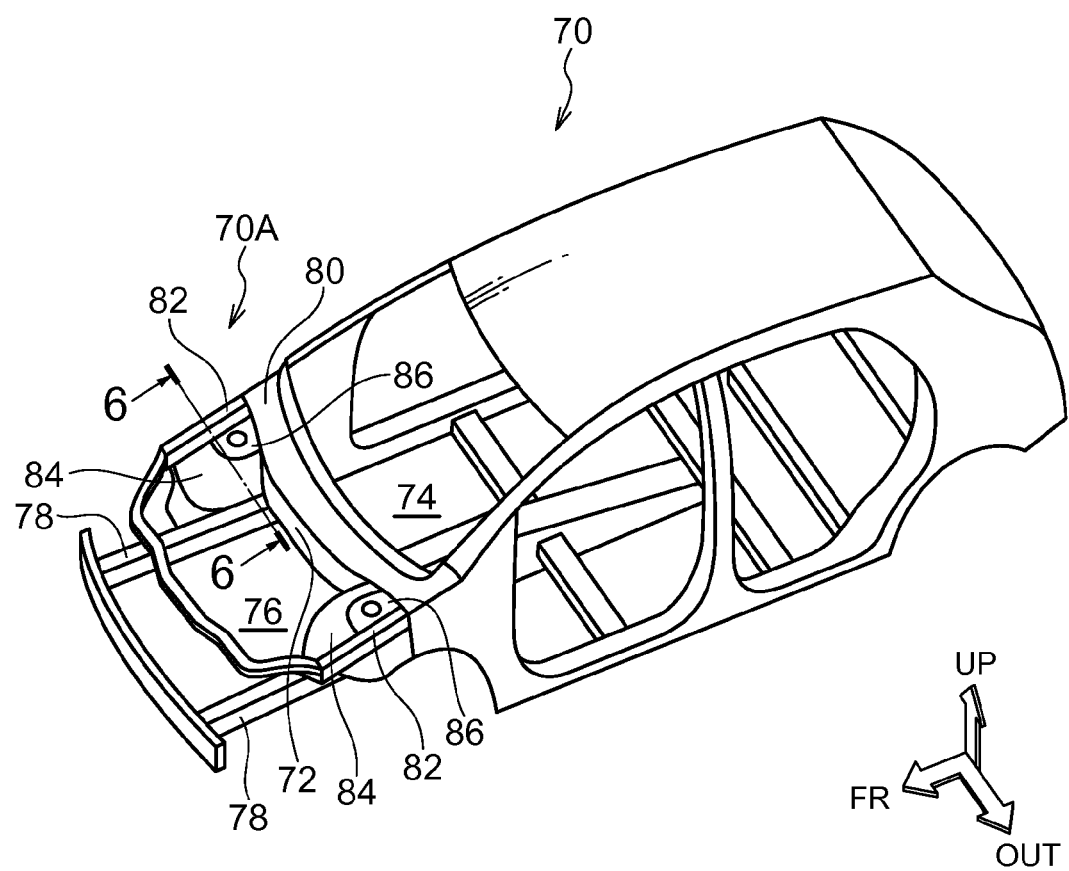
FIG. 5 is a perspective view showing a vehicle to which a laser joining structure relating to a third embodiment is applied.
Figure 6:
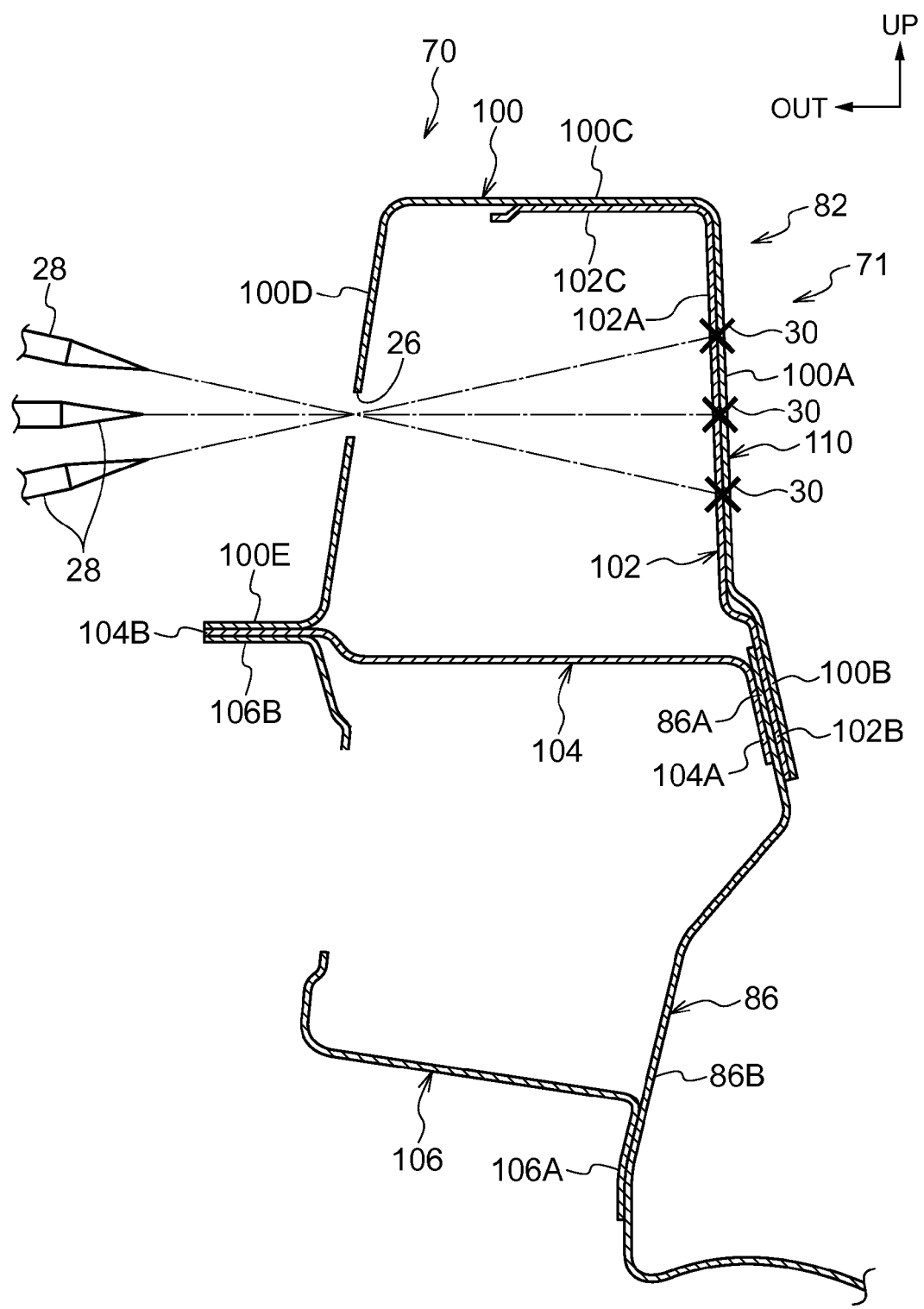
FIG. 6 is a cross-sectional view showing a vehicle skeleton member along line 6-6 in FIG. 5.

Next, a third embodiment of a laser joining structure relating to the present invention is described by FIG. 5 and FIG. 6. Note that structural portions that are the same as those of the above-described first and second embodiments are denoted by the same reference numerals, and description thereof is omitted.

A vehicle 70 to which a laser joining structure of the third embodiment is applied is shown in a perspective view in FIG. 5. Further, a cross-sectional view of a laser joining structure 71 along line 6-6 of FIG. 5 is shown in FIG. 6. Note that arrow FR that is shown appropriately in these drawings indicates the vehicle front side, arrow UP indicates the vehicle upper side, and arrow OUT indicates the vehicle transverse direction outer side.

As shown in FIG. 5, a plate-shaped dash panel 72 is disposed at a front portion 70A of the vehicle 70, along the vehicle vertical direction and between a vehicle cabin interior 74 and an engine room 76. A pair of left and right front side members 78 that extend in the vehicle longitudinal direction are set up at the engine room 76 at the vehicle front side of the dash panel 72.

A cowl 80 that extends along the vehicle transverse direction is set up at the upper end portion in the vehicle vertical direction of the dash panel 72. A pair of left and right apron upper members 82, that serve as vehicle skeleton members and that are disposed along the vehicle longitudinal direction, are connected to both end portions of the cowl 80 in the vehicle transverse direction. Suspension towers 84 are disposed between the apron upper members 82 and the front side members 78, and spring supports 86 are set up at the suspension towers 84.

As shown in FIG. 5 and FIG. 6, the apron upper members 82 are disposed at the outer side end portions in the vehicle transverse direction of the spring supports 86. The apron upper member 82 has an apron upper member outer 100 that is disposed at the vehicle upper side and is formed so as to open toward the vehicle lower side, and an apron upper member inner 102 that is disposed so as to contact the surface at the vehicle transverse direction inner side of the apron upper member outer 100 and whose cross-section is substantially L-shaped. Moreover, the apron upper member 82 has a reinforcement 104 that is disposed along the vehicle transverse direction at the vehicle lower side of the apron upper member outer 100, and an apron upper member lower 106 that is disposed at the vehicle lower side of the reinforcement 104.

The apron upper member outer 100 has a side wall portion 100A that is disposed substantially along the vehicle vertical direction at the vehicle transverse direction inner side, a lower end portion 100B that extends toward the vehicle lower side from the side wall portion 100A, a lateral wall portion 100C that extends toward the vehicle transverse direction outer side from the upper end portion of the side wall portion 100A, a side wall portion 100D that extends toward the vehicle lower side from the vehicle transverse direction outer side end portion of the lateral wall portion 100C, and a bent portion 100E that is bent toward the vehicle transverse direction outer side from the lower end portion of the side wall portion 100D.

The apron upper member inner 102 has a side wall portion 102A that is disposed substantially along the vehicle vertical direction, a lower end portion 102B that extends toward the vehicle lower side from the side wall portion 102A, and a lateral wall portion 102C that extends toward the vehicle transverse direction outer side from the upper end portion of the side wall portion 102A. The top surface of the lateral wall portion 102C of the apron upper member inner 102, and the side surfaces of the side wall portion 102A and the lower end portion 102B, are disposed so as to contact the region of the lateral wall portion 100C of the apron upper member outer 100 from the vehicle transverse direction intermediate portion to the vehicle transverse direction inner side thereof, and the side wall portion 100A and the lower end portion 100B, except for a portion thereof. An upper end portion 86A at the vehicle transverse direction outer side of the spring support 86 is disposed so as to contact the vehicle transverse direction outer side of the lower end portion 102B of the apron upper member inner 102.

The reinforcement 104 is built at the vehicle vertical direction intermediate portion of the apron upper member 82. A bent portion 104A, that is bent toward the vehicle lower side from the vehicle transverse direction inner side end portion, is formed at the reinforcement 104. The bent portion 104A is disposed so as to contact the upper end portion 86A of the spring support 86. An outer side end portion 104B, that extends toward the vehicle transverse direction outer side, of the reinforcement 104 is disposed so as to contact the bent portion 100E of the apron upper member outer 100 from the vehicle lower side.

The cross-section of the apron upper member lower 106 is formed in a substantial crank shape, and a bent portion 106A at the vehicle transverse direction inner side thereof is joined by welding (spot welding) to a side wall portion 86B of the spring support 86. A bent portion 106B, that is bent from the upper end portion at the vehicle transverse direction outer side toward the vehicle transverse direction outer side, is formed at the apron upper member lower 106. The bent portion 106B is disposed so as to contact the outer side end portion 104B of the reinforcement 104. The bent portion 100E of the apron upper member outer 100, the outer side end portion 104B of the reinforcement 104, and the bent portion 106B of the apron upper member lower 106 are joined by welding (spot welding).

Further, the lower end portion 100B of the apron upper member outer 100, the lower end portion 102B of the apron upper member inner 102, the upper end portion 86A of the spring support 86, and the bent portion 104A of the reinforcement 104 are joined by welding (spot welding).

In the present embodiment, the apron upper member outer 100 and the apron upper member inner 102 are formed by steel plates or metal plates of an aluminum alloy or the like.

A closed cross-section is formed at this apron upper member 82 by the apron upper member outer 100 and the apron upper member inner 102, and the reinforcement 104. Namely, the apron upper member 82 has a superposed region 110 at which the side wall portion 100A of the apron upper member outer 100 that serves as a first metal plate, and the side wall portion 102A of the apron upper member inner 102 that serves as a second metal plate, are superposed. Moreover, the apron upper member 82 has the side wall portion 100D of the apron upper member outer 100 that serves as a third metal plate and is disposed at an interval apart from the superposed region 110. The through-hole 26, that is for irradiating laser light from the laser light irradiating section 28 onto the superposed region 110, is formed in the side wall portion 100D.

At this apron upper member 82, the laser welded portion 30 is formed at the superposed region 110 by irradiating laser light from the laser light irradiating section 28 through the through-hole 26 of the side wall portion 100D onto the superposed region 110 of the side wall portion 100A of the apron upper member outer 100 and the side wall portion 102A of the apron upper member inner 102. Then, by changing the laser light irradiation angle of the laser light irradiating section 28 and irradiating laser light through the same through-hole 26 onto the superposed region 110, one or two or more (two in the present embodiment) of the laser welded portions 30, that are different than the aforementioned laser welded portion 30, are formed at the superposed region 110. Due thereto, the superposed region 110 of the side wall portion 100A of the apron upper member outer 100 and the side wall portion 102A of the apron upper member inner 102 is joined by the plural (three in the present embodiment) laser welded portions 30.

At this apron upper member 82, the number (one in the present embodiment) of the through-holes 26 of the side wall portion 100D is less than the number (three in the present embodiment) of the laser welded portions 30. Further, the inner diameter of the through-hole 26 can be made to be very small as compared with the case in which the electrode 210 for spot welding (see FIG. 8) is inserted through the through-hole 204. Therefore, a decrease in the strength or rigidity of the apron upper member outer 100 due to formation of the through-hole 26 can be suppressed.

Further, by applying the laser joining structure 71 to the apron upper member 82, a decrease in the strength and a decrease in rigidity of the joined portion of the apron upper member 82 can be suppressed, and the vehicle performances, such as collision safety and steering stability (body rigidity) and the like, can be improved.

Note that the third embodiment illustrates an example in which the laser joining structure 71 is applied to the apron upper member 82, but the present invention is not limited to this, and the laser joining structure of the present embodiment may be applied to another vehicle structural member of a vehicle. Moreover, the laser joining structure of the present embodiment is not limited to a vehicle structural member, and may be applied to another structural member apart from a vehicle.

EXPLANATION OF REFERENCE NUMERALS 10 structural member
11 laser joining structure
12 first metal plate
14 second metal plate
16 third metal plate (third plate)
20 superposed region
26 through-hole (through-portion)
28 laser light irradiating section
30 laser welded portion
50 structural member
51 laser joining structure
52 superposed region
70 vehicle
71 laser joining structure
82 apron upper member
100 apron upper member outer
100A side wall portion (first metal plate)
100D side wall portion (third metal plate)
102 apron upper member inner
102A side wall portion (second metal plate)
104 reinforcement
110 superposed region

The invention claimed is:
1. A laser joining structure comprising:
at least two metal plates that are disposed so as to be superposed with one another to create a superposed region, and at which the superposed region is joined by laser welded portions at two or more places;
a third plate, other than the at least two metal plates, that includes a portion that is disposed at an interval apart from the superposed region; and a through-portion that:
(1) is formed in the portion of the third plate that is disposed at an interval apart from the superposed region;
(2) at which laser light passes-through the third plate and is irradiated onto the superposed region to create a number of laser welded portions in the superposed region; and
(3) is of a number that is less than the number of the laser welded portions in the superposed region.

2. The laser joining structure of claim 1, wherein a hole diameter of the through-portion is set to a dimension that is such that an electrode for spot welding cannot be inserted therethrough but the laser light can pass therethrough.

3. The laser joining structure of claim 1, wherein
the third plate is a metal plate, and
a closed cross-section is formed by at least the two metal plates and the third metal plate.

4. The laser joining structure of claim 3, wherein a vehicle skeleton member is structured by at least the two metal plates and the third metal plate.

5. A laser joining method comprising:
a step of placing at least two metal plates so as to be superposed with one another to create a superposed region, and irradiating laser light from a laser light irradiating device through a through-portion, which is formed in a portion of a third plate that is disposed at an interval apart from the superposed region, onto the superposed region, and forming a laser welded portion at the superposed region; and
a step of, by changing a laser light irradiation angle of the laser light irradiating device and irradiating laser light through a same through-portion onto the superposed region, forming one or two or more laser welded portions, which are different than the laser welded portion, at the superposed region.

* * * * *